Figures 1, 1A:
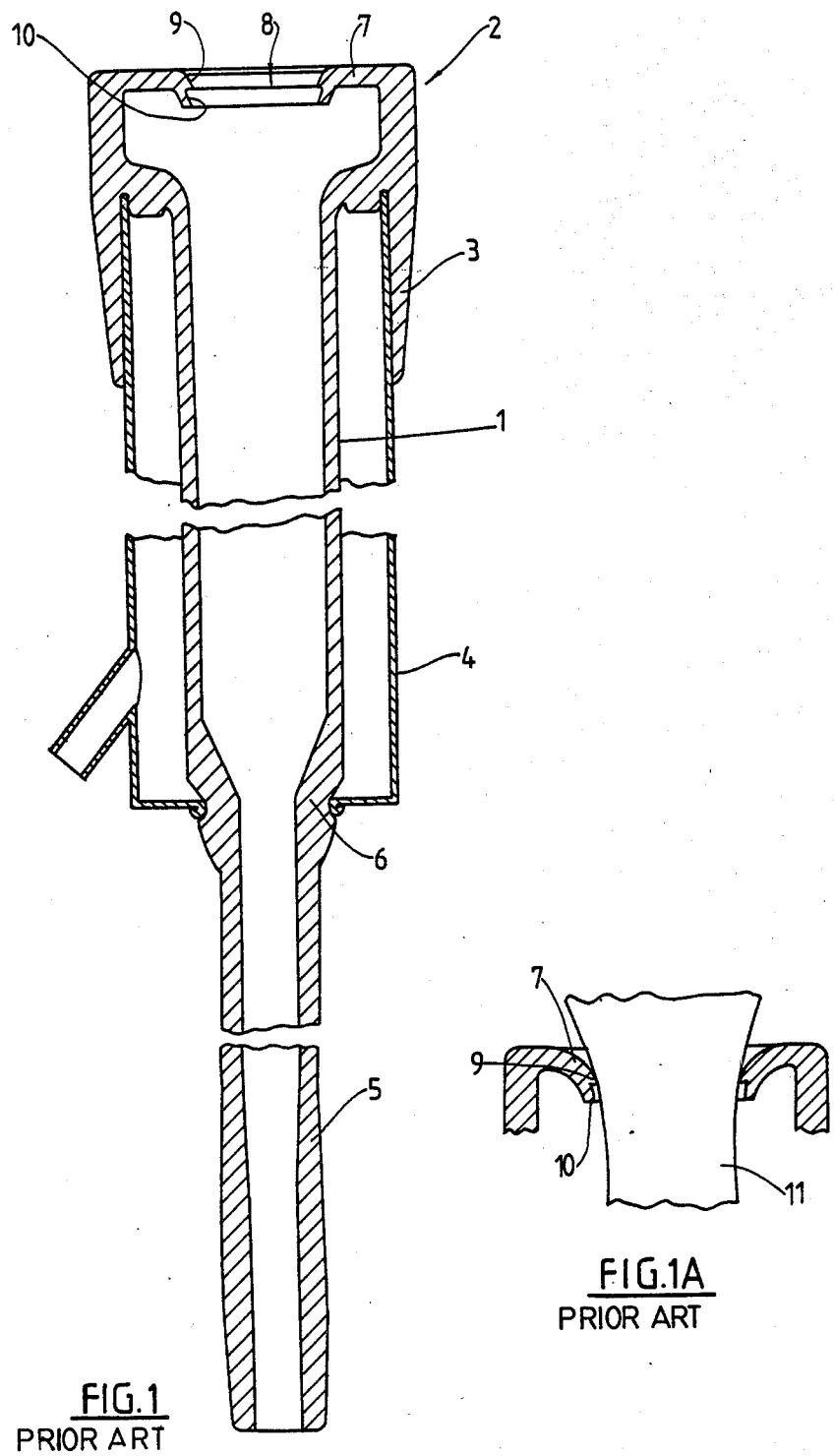

United States Patent [19]
Mills

[11] Patent Number: 4,457,262
[45] Date of Patent: Jul. 3, 1984

[54] MILKING INFLATIONS

[76] Inventor: Geoffrey S. Mills, Walton Park, Walton, Waikato, New Zealand

[21] Appl. No.: 410,076

[22] Filed: Aug. 20, 1982

[30] Foreign Application Priority Data

Sep. 7, 1981 [NZ] New Zealand .................. 198284

[51] Int. Cl.³ .............................................. A01J 5/08
[52] U.S. Cl. .................................. 119/14.47; 119/14.5
[58] Field of Search ............... 119/14.47, 14.48, 14.49, 119/14.50, 14.51, 14.52

[56] References Cited

U.S. PATENT DOCUMENTS

| | | | |
|---|---|---|---|
| 952,122 | 3/1910 | Lane | 119/14.47 |
| 3,771,494 | 11/1973 | Mills | 119/14.47 |
| 4,320,718 | 3/1982 | Hoefelmayr et al. | 119/14.47 |

FOREIGN PATENT DOCUMENTS

| | | |
|---|---|---|
| 176184 | 12/1975 | New Zealand . |
| 1003968 | 9/1965 | United Kingdom .............. 119/14.50 |

Primary Examiner—Hugh R. Chamblee
Attorney, Agent, or Firm—Holman & Stern

[57] ABSTRACT

A milking inflation or liner of the soft tubular rubber kind arranged for fitment in a rigid tubular teat cup shell to which pulsating air/vacuum is applied, the invention comprising the provision at the head or mouth end part of the inflation of a flexible resilient teat engaging collar having an inner annular part defining the inflation mouth in the form of a depending flange shaped to provide an inner inverted frusto-conical face at least part of which constitutes a main vacuum seal when engaged about an animal's teat, the upper inner portion of the collar from which the flange depends being inclined upwardly from the outer part of the collar and the junction of said frusto-conical face and inclined upper part being shaped to define a supplementary unbroken annular seal spaced from the frusto-conical face to be capable of engaging and sealing on the animal's teat during flexing of the collar in milking operations.

13 Claims, 12 Drawing Figures

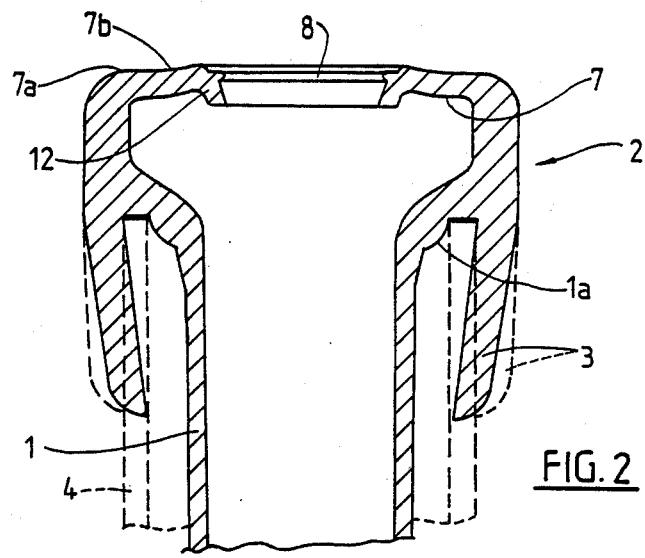
FIG. 2
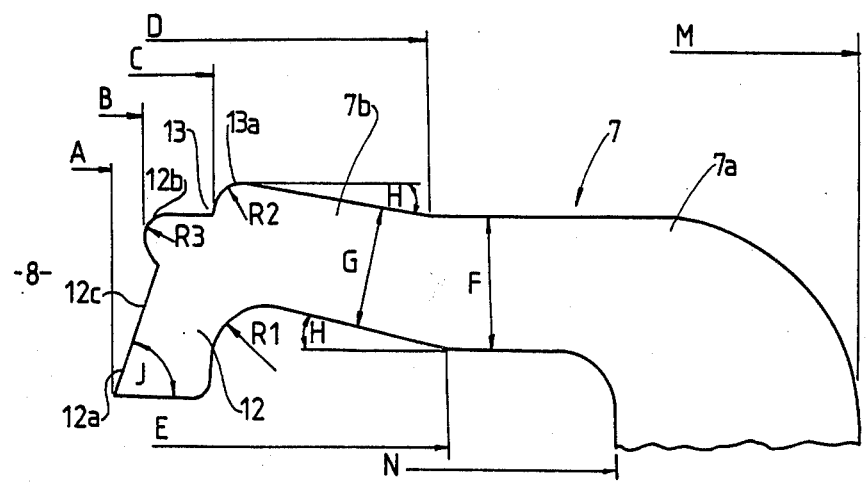
FIG. 2A
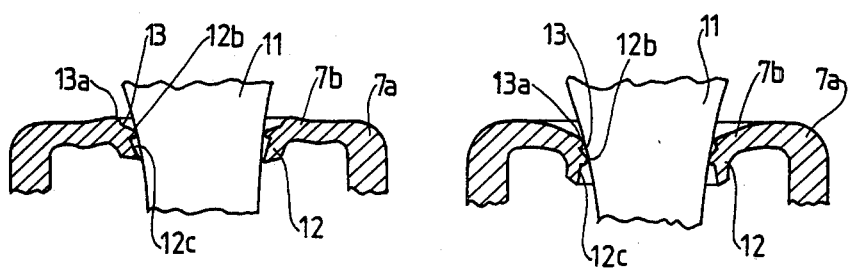
FIG. 2B
FIG. 2C

MILKING INFLATIONS

This invention relates to milking inflations and more particularly relates to the head or mouth end portions of milking inflations or liners for teat cups, and the manner in which such inflations engage on the teats of an animal to be milked.

The constructions of many milking inflations, particularly at the head or mouth end, provide that the inflations have a resilient collar to engage and seal upon the teat of an animal in a manner whereby sometimes undue pressure is applied to the teat over a very small contact area to obtain the required seal and prevent the teat cup and inflation from being accidentally dislodged from the teat in use, and such necessary pressure exerted over a small area can irritate the animal being milked and cause congestion and hamper milk flow.

Further, a single sealing line of contact between the inflation and animal's teat is often insufficient to provide an adequate vacuum seal and it has been proposed in New Zealand patent specification No. 176184 to provide upper and lower closely spaced annular sealing surfaces to spread the pressure and provide a more positive vacuum seal. An object of this invention is to provide improvements to the milking inflation according to specification No. 176184 to further improve the sealing of the inflation of an animal's teat with flexing during milking operations and for some otherwise difficult animals.

Other and more particular objects and advantages of the invention will become apparent from the ensuing description.

According to a first aspect of this invention therefor there is provided a milking inflation characterised by the provision at the mouth end part of the inflation of a flexible and resilient teat engaging collar having an inner annular part surrounding the inflation mouth shaped to form at least three uninterrupted sealing surfaces engageable with an animal's teat, the shape of the collar and disposition of said sealing surfaces providing that an air/vacuum sealing contact with the teat is maintainable by at least two of said three surfaces under flexing or deflecting of the collar up and down relative to the remainder of the inflation and the teat during milking.

According to a second aspect of the invention there is provided a milking inflation characterised by the provision at the mouth end part of the inflation of a flexible and resilient teat engaging collar having an inner annular part surrounding the inflation mouth extending inwardly from an outer upper junction with an outer annular wall part of the inflation and inclined upwardly relative to the horizontal to have an inner peripheral depending annular flange part the inner face of which defines an inverted frusto-conical face at least part of which is arranged to constitute a main vacuum seal on an animal's teat; the junction between the depending flange and upper inclined parts being shaped to define a supplementary unbroken annular seal at the upper inclined face and spaced from said inverted frusto-conical face to be capable of engaging and sealing on the animal's teat during flexing of the collar in milking operations.

According to another aspect of the invention, in the inflation according to the preceding paragraph the lower inner peripheral portion of said flange part is acute angled in cross-section.

According to a still further aspect of the invention, in the inflation of the preceding paragraph said flange has a rounded depending annular base set back from said acute angled lower peripheral portion.

Figure 3:
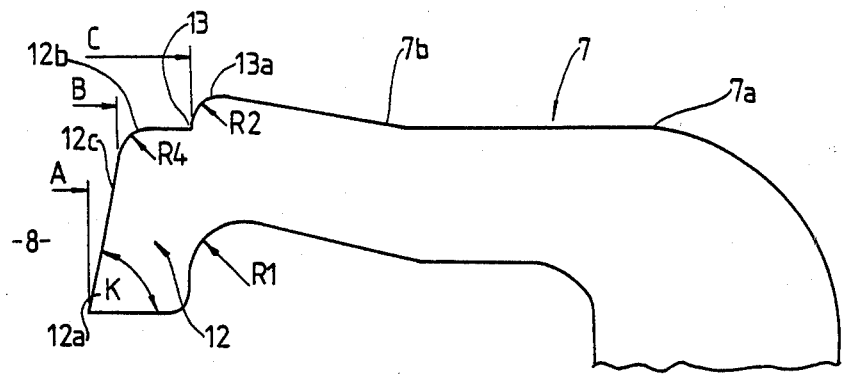
Figure 4:
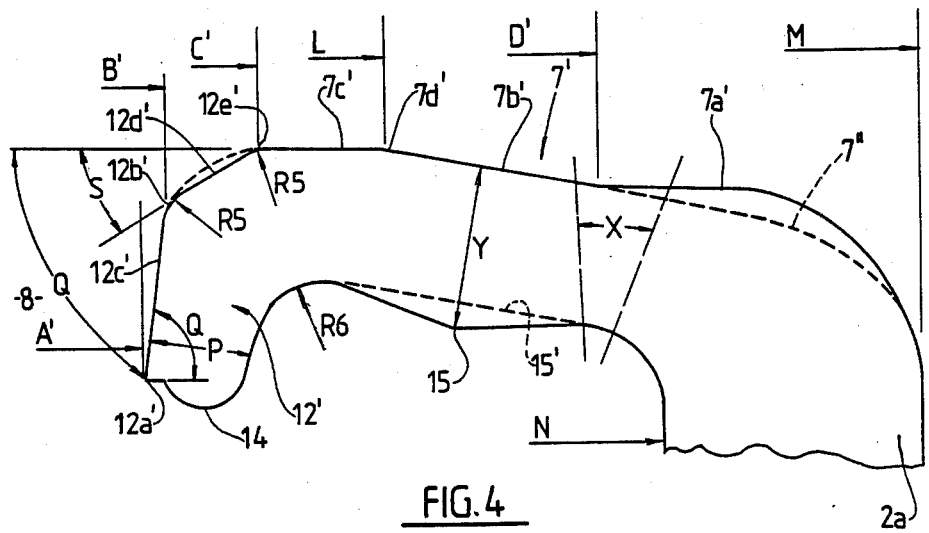
Figure 5:
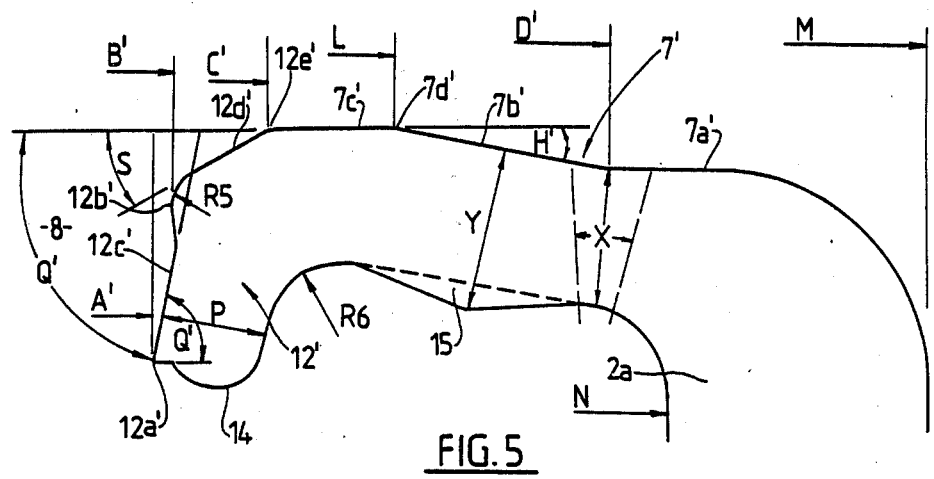
Figure 5A:
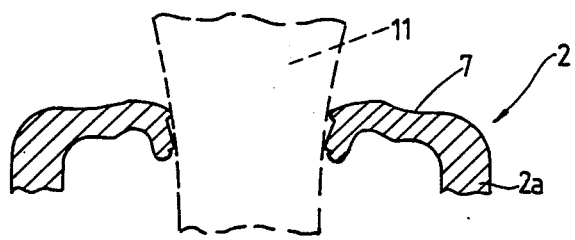
Figure 5B:
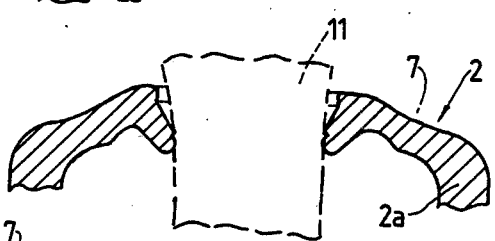
Figure 5C:
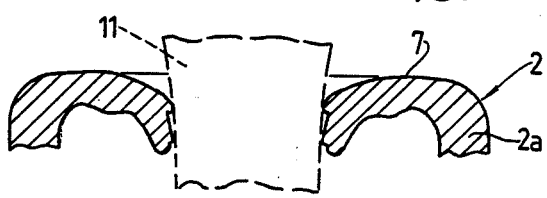

Some preferred aspects of the present invention will now be described by way of example and with reference to the accompanying drawings, in which:

FIG. 1: is a part-broken longitudinal sectional view of one prior art construction of milking inflation in accordance with New Zealand Pat. No. 176184 and showing the location of the inflation relative to a typical teat cup shell;

FIG. 1A: is a fragmentary sectional view showing the flexing of the collar part of the inflation of FIG. 1, during milking;

FIG. 2: is a sectional view illustrating the mouth end part of one form of inflation in accordance with the invention;

FIG. 2A: is a fragmentary enlargement of the relevant portion of the collar of the inflation according to FIG. 2;

FIGS. 2B & 2C: are fragmentary sectional views illustrating flexing of the collar during milking;

FIGS. 3, 4 & 5: are fragmentary views similar to FIG. 2A and illustrating a further modification of the present invention, and;

FIGS. 5A, 5B & 5C: are fragmentary sectional views illustrating flexing of the inflation during milking.

As is usual or preferred, the inflation may be constructed by any suitable means from such as a natural or synthetic rubber material or from an elastomeric vinyl plastics material such as a polyvinyl chloride or other suitable plastics material having properties desirable in the construction of milking inflations, i.e. desirable resilient qualities and qualities facilitating cleaning and sterilising of the inflation without the inflation absorbing or retaining any of the cleaning or sterilising agents which could irritate an animal or contaminate milk received from the animal. The invention is particularly concerned with the teat engaging collar portions of the inflations and the remaining parts of the inflations may vary according to particular requirements and teat cup instructions.

Referring firstly to FIG. 1 of the drawings, a typical milking inflation has a resilient cylindrical tubular body part 1 which is locatable about the major part of the teat (not shown in FIG. 1) of an animal and the body part 1 merges into an integral head or mouth end part, generally indicated by the arrow 2, having an outer downwardly extending annular flange 3 spaced from the body part and locatable and sealable about a cylindrical tubular teat cup shell 4 to which pulsating vacuum/air is applied and within which the inflation body part 1 is housed; the lower end part of the body 1 merging into a tubular conduit 5 and the junction part 6 between the body 1 and conduit 5 passing through and being sealably engaged with the lower end of the shell 4. The teat cup shell 4 may be of metal or any other suitable rigid material e.g. a rigid plastics material.

In the construction according to my New Zealand specification No. 176184, and as illustrated in FIG. 1, the upper part 7 of the inflation collar surrounding the inflation mouth 8 is flat and horizontal or lying in a plane generally normal to the axis of the inflation prior to engagement with an animal's teat, and the portion of the collar surrounding or defining the mouth 8 has upper and lower closely spaced annular sealing surfaces 9 and 10. In the use of such inflations during milking when fitted to an animal's teat 11 and placed under vacuum pressure via the milk line and connecting conduit 5, as illustrated in FIG. 1A the inner part 7 of the collar deflects downwardly and as a consequence with some animals there may result in a loss of vacuum seal and teat grip at the lower inner sealing surface or line of contact 10. The present invention overcomes this potential loss of vacuum seal and teat grip by inclining at least the inner upper part 7 of the collar upwardly from the outer peripheral part towards the inflation mouth 8, and by providing at least one but preferably two or more additional unbroken annular sealing surfaces at and adjacent the mouth 8 for engaging the animal's teat 11 whilst flexing of the collar upper part 7 takes place during milking.

Referring now to FIGS. 2, 2A, 2B and 2C illustrating a first form of the inflation according to the present invention, the inner upper part 7b of the collar is inclined upwardly at a slight angle H relative to the horizontal outer upper part 7a of the collar so that when such inner part 7b is deflected downwardly in operation as aforesaid and as shown in FIG. 2B, it will tend to the horizontal position without the inner lower peripheral frusto-conical face 12c and corner 12a of the inner depending flange part 12 being moved sufficiently outwardly to break the grip and seal with the animal's teat 11. Additionally, the upper surface part at the junction between the depending flange portion 12 and inclined collar part 7b has an annular recess or step 13 defining a further supplementary unbroken sealing surface 13a at the junction with the upper inclined face of collar part 7b and which is preferably of rounded formation and is capable of engaging and sealing on an animal's teat during further downward flexing of the collar upper part 7, as illustrated by example in FIG. 2C, in the milking operation so as to provide a supplementary positive vacuum seal.

The arrangement shown in FIG. 3 illustrates the one simple arrangement with a double seal at 13a and the full inner inverted frusto-conical face 12c, of the depending flange 12, the upper end of which may be also rounded at the junction with the step formation 13; but in the first arrangement and as illustrated in FIG. 2 and in the enlargement at FIG. 2A, the junction between the depending flange 12 and step 13 is bulged inwardly to provide an inner annular rib 12b so that in this construction there are three separate unbroken sealing surfaces or corner parts with the lower and upper surfaces 12a and 12b of the flange 12 providing the normal seals and teat gripping surfaces and the surface 13a at the junction between the step 13 and the inclined part 7b providing a third supplementary seal when the part 7b flexes further downwardly from the horizontal.

It will be appreciated that the teat sizes on various animals may differ considerably and that variations in the particular dimensions of the inflations can be made, but for a standardised milking inflation in accordance with the present invention the following dimensions may be appropriate (referring to FIG. 2A and applicable to FIG. 3 also):

The mouth diameter A at the inner lower edge of the depending flange 12 may be between 19 and 20 millimeters (e.g. 19.8 mm for some breeds of animal);

The diameter B of the mouth at the upper inner edge part (the rib 13b in the construction according to FIGS. 2 and 2A) of the depending flange 12 at the step 13 may be 21.4 millimeters;

The outer diameter C of the step 13 may be 24.8 millimeters;

The outer diameter D of the inclined part 7b of the collar 2 (to the junction with the horizontal part 7a on the upper surface) may be 35.2 millimeters;

The diameter E on the underside of the inclined part 7b at the junction with the horizontal part 7a may be the same as for D or slightly greater e.g. 36 millimeters in diameter;

The outer diameter M of the collar may be in the region of 50 millimeters and the inner diameter N of the wall 2a 44 millimeters;

The thickness F of the horizontal part 7a of the collar may be 3.2 millimeters and the thickness G of the inclined inner part 7b will be less than F according to the angle of inclination so that the inner part 7b can flex to a greater degree than the outer part 7a of the collar 2;

The angle of inclination H of the inclined inner part 7b to the horizontal outer part 7a may be in the region of 13 degrees;

The inner junction between the depending flange part 12 and the inclined collar part 7b is preferably radiused and may for example have a radius at R1 of 1.4 millimeters;

The radius R2 at the junction of the step 13 and upper face of the inclined part 7b may be 0.75 millimeters and the radius R3 of the rib 12b at the upper side of the depending flange 12, according to the construction shown in FIGS. 2, 2A, 2B and 2C, may be 0.5 millimeters;

The radius R4 at the upper end of the depending flange part 12 in the construction according to FIG. 3 may be from 0.5 to 0.75 millimeters.

In these two forms of the invention the base surface of the depending flange part 12 may be normally substantially horizontally disposed and the acute angle defined by such base and inner face of the depending flange 6 may be between 70 and 85 degrees; and in the construction according to FIGS. 2, 2A, 2B and 2C, the angle J may be 70 degrees and in the case of the construction according to FIG. 3 the angle K may be 75 to 80 degrees.

Some next alternative and preferred forms of the invention will now be described with reference to FIGS. 4, 5, 5A, 5B and 5C of the drawings. In these constructions efficient sealing and effective teat gripping by the inflation is maintained over a wide range of flexing movement of the inflation collar upper part 7' by providing five uninterrupted annular sealing surfaces or lines of contact.

The depending flange 12' has the previously described inverted frusto-conical inner face 12c' and a lower inner peripheral corner 12a' of acute angled cross-section forming a first seal and gripping surface minimising risk of accidental dislodgement during milking, but instead of extending fully horizontally at the base of the flange 12' the base of the acute angle corner part 12a' extends horizontally a very short distance e.g. 0.4 of a millimeter, and merges into a downwardly directed annular rounded formation 14 projecting about 0.6 millimeters below the corner 12a' at the base of the flange 12' to provide a lower second seal engaging the teat 11 on upward flexing of the collar upper part 7' relative to the remainder of the inflation (as shown in FIG. 5B) e.g. when the inflation is pulled downwardly under the weight of the teat cup claw assembly and/or affected by cow movement. This arrangement provides that the small angled corner part 12a' and the lower rounded second seal 14 can efficiently maintain a grip on and seal with the animal's teat without the sharp corner 12a digging deeply into the teat surface and causing discomfort or milk flow restriction.

The depending flange 12' may present a steep angled full flat inner surface 12c' for the major part of its length and as shown in FIG. 4, and merge into a shallow angled second frusto-conical face 12d' at the mouth entrance to form a third sealing corner surface 12b' at the junction between the two frusto-conical faces 12c' and 12d'. The second frusto-conical face 12d' may be substantially flat as indicated in full in the FIGS. 4 and 5 or slightly convex as indicated in broken outline in FIG. 4, and merges into a horizontal annulus 7c' which in turn joins the upwardly and inwardly inclined inner upper part 7b' stemming from the horizontal outer peripheral edge part 5a' of the collar 2; the rounded junction 12e' between the second frusto-conical face 12d' and horizontal annulus 7c' defining a fourth corner sealing surface effective as the inner upper part flexes downwardly (as indicated in FIG. 5C), and the junction 7d' between the horizontal annulus 7c' and upper surface of inner inclined part 7b' forming a fifth corner seal effective with extreme downward flexing of the collar upper part 7'.

The lower inner side of the collar upper part 7' between the inner depending flange 12' and the outer wall part 2a of the collar 2 may extend substantially parallel with the upper face of the inner inclined part 7b' for the major part of its width (as indicated in broken outline at 15' in FIGS. 4 and 5) but preferably the collar upper part 7' is strengthened by thickening medially as shown in full at 15 so that it may generally retain its shape during milking operations for effective support of and efficient grip by the inflation, and flexing will in the main take place in the region X of least thickness of the collar outer upper part 7' near the junction with the collar outer wall 2a.

The form of the invention illustrated in FIGS. 5, 5A, 5B and 5C is substantially identical to the form of FIG. 4 except that the angle of inclination of the lower inner face 12c' of the flange 12' is increased slightly whilst retaining the same diameter at the third sealing corner part 12b' so that such third corner part 12b' is effectively bulged inwardly of the inflation mouth 8 to improve the sealing and gripping effect of third sealing corner part 12b'.

In these alternative preferred forms of the invention according to FIGS. 4, 5 and 5A, some preferred dimensions found to be particularly effective in experimental and prototype inflations, are as follows:

| | |
|---|---|
| Mouth diameter A' at corner 12a' | = 19 to 19.8 millimeters |
| Mouth diameter B' at corner 12b' | = 20.6 millimeters |
| Mouth diameter C' at corner 12e' | = 25 millimeters |
| Diameter L over annulus 7c' | = 31 millimeters |
| Diameter D' over inclined surface 7b' | = 41 millimeters |
| Minimum thickness of upper part 7' at X | = 3.2 millimeters |
| Maximum thickness of upper part 7' at Y | = 4 millimeters |
| Diameter M' over the collar 2 | = 50.2 millimeters |
| Diameter N' inside the collar wall 2a | = 4.4 millimeters |
| Radius R5 at corner part 12b' and 12e' | = 1.1 millimeters |
| Inner radius R6 of the flange 12' | = 0.9 millimeters |
| Angle of inclination H' of the inner upper part 7b' | = 10° |
| Thickness P of flange 12' | = 2.4 millimeters |
| Angles Q of the flange 12' and corner 12a' | = 83° |
| Angles Q' of the flange 12' and corner 12a' | = 78° |
| Angle S of face 12d' at the mouth 8 | = 30° |

As previously mentioned, the invention is not to be regarded as confined to inflations having the afore-mentioned dimensions (all constructions) as the dimensions given are those for some preferred examples only. It is envisaged also that the upper surface of the collar upper part may incline fully from its junction with the outer wall 2a, as indicated in broken outline at 7" in FIG. 4.

Thus, the invention provides a milking inflation with a collar formation including at least two and preferably three or more uninterrupted sealing surfaces for engagement with an animal's teat and shaped such that at least two of said surfaces are maintained in contact with the teat so as to provide supplementary sealing with flexing of the inflation collar during milking operations, and possible interruption of any one of the sealing surfaces which might otherwise cause vacuum loss during operation. The inflation is particularly suited to difficult animals and provides a spreading of the sealing contact surfaces with an animal's teat so that the animal will not be unduly irritated when fitted with inflations in accordance with the invention, and so that milk flow is not restricted.

Particular forms of the invention have been described and illustrated by way of example, but it will be appreciated that further variations of or modifications to the invention can take place without departing from the scope of the appended claims.

I claim:

1. In a flexible milking inflation of the type having a teat-engaging mouth end portion and being adapted for disposition within a rigid teat cup shell to which pulsating air vacuum is applied, the improvement comprising a flexible, resilient teat-engaging collar disposed at the mouth end portion of the inflation, said collar having an inner annular portion surrounding the inflation mouth shaped to form an inner depending flange portion defining at least in part an inverted frustro-conical face, said depending flange portion being further shaped to form at least three uninterrupted annular sealing surfaces engageable with the teat; the shape of the collar and disposition of said sealing surfaces being such that an air/vacuum sealing contact with the teat is maintainable by at least two of the three surfaces under flexing or deflecting of the collar up and down relative to the remainder of the inflation and the teat during milking.

2. A milking inflation as claimed in claim 1 or claim 4 wherein the base of the depending flange is substantially flat and horizontally disposed for a major part of the thickness thereof.

3. A milking inflation as claimed in claim 1 wherein the collar has an inclined inner upper part merging into a horizontal upper annulus part adjacent the inflation mouth.

4. A milking inflation as claimed in claim 1 wherein the angle of inclination of said frusto-conical inner face of the depending flange is between 77 and 85 degrees to the horizontal.

5. A milking inflation as claimed in claim 1 wherein the upper part of the collar extends inwardly and is inclined upwardly from an outer part, to merge into said depending flange portion.

6. A milking inflation as claimed in claim 5 wherein the angle of inclination of said collar upper part is between 9 and 14 degrees to the horizontal.

7. A milking inflation as claimed in claim 5 wherein the two uppermost of said sealing surfaces are disposed at the junction portion between the frusto-conical face of the depending flange and said upper inclined part, and an annular recess is provided intermediate said two uppermost sealing surfaces.

8. A milking inflation as claimed in claim 1 wherein the lower inner peripheral portion of said flange portion is acute angled in cross-section.

9. A milking inflation as claimed in claim 8 wherein the upper edge part of the depending flange is bulged inwardly of the inflation mouth relative to said frusto-conical face in forming a projecting annular sealing and teat gripping surface spaced from the said angled lower inner peripheral portion of the depending flange portion.

10. A milking inflation as claimed in claim 8 wherein the base of the depending flange has a depending annular rounded part extending below and slightly spaced from the said angled lower inner peripheral portion to form another supplementary sealing and teat gripping surface effective on upward flexing of the collar upper part relative to the remainder of the inflation.

11. A milking inflation as claimed in claim 8 wherein the acute angle of the lower inner peripheral portion of the depending flange is between 77 and 85 degrees.

12. A milking inflation as claimed in claim 1 wherein the collar upper part has an outer part with a horizontal upper surface merging into an upwardly inclined inner annular part.

13. A milking inflation as claimed in claim 12 wherein the collar upper part is thickened medially of the inner inclined part and is of least thickness in the region of the junction between said inner and outer part to facilitate flexing of the inner part at said region.

* * * * *